(12) United States Patent
Scholer

(10) Patent No.: US 6,506,247 B1
(45) Date of Patent: Jan. 14, 2003

(54) LOW SILICA FURNACE CEMENT

(75) Inventor: Fred Richard Scholer, East Windsor, NJ (US)

(73) Assignee: Hercules Chemical Company Incorporated, Passaic, NJ (US)

( * ) Notice: Subject to any disclaimer, the term of this patent is extended or adjusted under 35 U.S.C. 154(b) by 0 days.

(21) Appl. No.: 09/996,291

(22) Filed: Nov. 28, 2001

(51) Int. Cl.⁷ ............................................. C04B 12/04
(52) U.S. Cl. ........................................ 106/600; 106/602
(58) Field of Search ................................ 106/600, 602

(56) References Cited

U.S. PATENT DOCUMENTS

| | | |
|---|---|---|
| 3,971,655 A | 7/1976 | Takashima et al. |
| 3,986,884 A | 10/1976 | Criss et al. |
| 4,069,060 A | 1/1978 | Hayashi et al. |
| 4,661,160 A | 4/1987 | Novinson |
| 4,680,279 A | 7/1987 | Kleeb |
| 4,696,698 A * | 9/1987 | Harriett ................. 405/267 |
| 5,427,360 A | 6/1995 | Erny |
| 5,562,880 A | 10/1996 | Erny et al. |
| 6,179,610 B1 | 1/2001 | Suey et al. |

* cited by examiner

*Primary Examiner*—Paul Marcantoni
(74) *Attorney, Agent, or Firm*—Stroock & Stroock & Lavan LLP

(57) ABSTRACT

A refractory furnace cement is provided, that can be formulated to be air setting and substantially free of silica. The composition can be formed with a refractory agent, a rheology modifier, a corrosion inhibitor, a binder, such as a sodium silicate type binder, a flocculating agent and various inorganic fillers, to promote thermal stability, shelf stability, appropriate setting times and cold mortar strength.

21 Claims, No Drawings

LOW SILICA FURNACE CEMENT

BACKGROUND OF INVENTION

The invention relates generally to refractory materials used for furnace construction and more particularly, to a cement-like composition for use in the construction and maintenance of heating systems, particularly furnaces.

Bonding cements frequently must meet a carefully adjusted balance of properties. For convenience, they should have good working properties when mixed to a putty-like or cream-like consistency after water has been added. They frequently should also have long working or "open" times, so that a large batch can be prepared and adequate time transpires, before the batch hardens. Often they need to have certain "green" strength and stability prior to hardening so that assembled structures will hold their shape while curing.

The thermal properties of the cured cement are also particularly important. For example, furnace materials are frequently subjected to very high temperatures. This typically causes the materials used to construct the furnace to expand, in accordance with their thermal expansion coefficient. Thus, the thermal expansion coefficient of the cement should be taken into account, to confirm that it is compatible with the other materials used to construct the furnace. If different materials expand at different rates, cracking can occur.

Adhesive-like construction materials can be classified into different categories. These include reactive materials, heat-setting materials and air setting materials. Air-setting materials are more generally more convenient to work with. Reactive materials, such as epoxy type materials, are generally provided as two component systems. Heat setting cements can be inconvenient to work with.

Conventional refractory cement includes significant portions of crystalline silicon dioxide ($SiO_2$), also referred to as silica. The use of silicon dioxide in construction materials has caused concern by some, because the sanding, cutting and crushing of these materials can liberate fine silica powder into the air. It is a concern to some that if these materials are inhaled, that they can lead to health risks.

The use of a silica free refractory composition is described in U.S. Pat. No. 3,986,884, the contents of which are incorporated herein by reference. This patent describes the use of substantial quantities of chromic oxide. Chromic oxide includes chromium, a heavy metal, the disposal of which can cause concern. See also, the following U.S. patents, the contents of which are incorporated herein by reference U.S. Pat. Nos. 6,179,610; 5,562,880; 5,427,360; 4,661,160; 4,069,060; 3,986,884 and 3,971,655. Other proposals for formulating silica free refractory compositions have also met with various drawbacks, either in terms of acceptability of working time, strength, heat resistance, thermal expansion, durability and the like.

Accordingly, it is desirable to provide a substantially silica-free refractory furnace cement (mortar), which overcomes the drawbacks of the prior art.

SUMMARY OF THE INVENTION

Generally speaking, in accordance with the invention, a refractory furnace cement (mortar) is provided, that can be formulated to be air setting and substantially free of silica. The composition can be formed with a refractory agent, a rheology modifier, a corrosion inhibitor, a binder, such as a sodium silicate type binder, a flocculating agent and various inorganic fillers, to promote thermal stability, shelf stability, appropriate setting times and cold mortar strength.

Compositions in accordance with the invention can include silicates, such as sodium silicates and calcium silicates. Silica free refractory materials, such as alumino silicates, including mica and neptheline syenite, can also be included. As used herein, a silica free refractory material is not necessarily 100% silica free, but can contain up to about 0.10% silicon dioxide. Materials such as wallastonites, which can act as bonding material enhancers and protect against corrosion are also advantageous. Rheology modifiers, such as bentonite clays can also lead to improved compositions. Fillers, including clay fillers to improve thermal stability are also advantageous. The components should be selected and proportioned in appropriate ratios to enhance the desired properties and provide a good performing air setting mortar which is substantially free of $SiO_2$.

Accordingly, it is an object of the invention to provide an improved refractory mortar.

Another object of the invention is to provide an improve method of making a refractory mortar.

Still another object of the invention is to provide an improved air setting furnace mortar.

Yet another object of the invention is to provide an improved method of making an air setting mortar.

The invention accordingly comprises the several steps and the relation of one or more of such steps with respect to each of the others, and the compositions and constructions effected by such steps, all as will be exemplified in the following detailed disclosure, and the scope of the invention will be indicated in the claims.

Due to the strong adhesive properties of the compositions of the present invention, and their ability to be reworked, the compositions can be used for other applications, such as filling openings, where pipe passes through walls or floors, to fill gaps, where the application of wall boards produces gaps and to seal openings in construction walls or floors to prevent passage of gas or heat between adjacent structures.

DETAILED DESCRIPTION OF THE PREFERRED EMBODIMENTS

The invention is directed to a composition for an air setting refractory furnace mortar, and method of formation, which is substantially free of silicon dioxide. Thus, compositions having not only less than 3% silicon dioxide, but less than 1% and even less than 0.10% silicon dioxide can be provided. The invention is also directed to a composition substantially free of silicon dioxide, but has the setting and performance characteristics of a quality air setting mortar.

The mortar should be formulated with effective proportions of materials to provide mortar having good working and handling properties when used in a putty-like or cream-like state. Mortar in accordance with the invention can be formulated to have excellent workability and water retention, so that it can be trawled or spread into joints or openings or on brick surfaces. Mortar in accordance with the invention can be formulated so as not to shrink during curing and to have appropriate hot and cold bonding strength properties. Furthermore, its refractory properties can be made high enough, so that it will not melt or flow from the joints under furnace operating conditions. The air setting times, cold bonding strength and thermal stability, as measured by PCE (pyrometric cone equivalent), will be able to meet commercial standards of conventional cements containing silicon dioxide.

Air setting mortars in accordance with the invention can take a relatively strong set upon drying and provide a firm bond at elevated temperatures. They can form chemically strong joints with high resistance to abrasion and erosion. Chemical binders can be included to impart favorable air setting properties and to maintain the strength of the bond up to the temperature at which the ceramic bond takes effect.

Mortars in accordance with the invention can include silicates, such as sodium silicate and potassium silica. Other acceptable silicates include calcium. The silicate component has the function of hardening the air setting mortar. If too much silicate is included, the mortar might not air-dry properly. If not enough silicate is included, the mortar can be too friable and have poor bonding strength. Acceptable sodium silicate ranges include from 20% to 50%, preferably 30% to 40% and more preferably 32% to 37%.

Refractory compositions in accordance with the invention can also include alumino silicates, including hydrous alumino silicates (micas). Certain zeolites and other substituted alumino silicates can also be acceptable. Fiberglass can also be used, but can lead to certain irritant related disadvantages. Neptheline syenite (nepthelite), a potassium and sodium substituted alumino silicate preferred. These materials improve the heat resistance of the material. If too little is added, the stability to higher temperature can decrease. If too much is included the shelf life of the mortar can be too short. Acceptable compositions include 0% to 30%, preferably 2% to 30%, more preferably 4% to 10% of these materials.

Compositions in accordance with the invention also advantageously include wallastonites as bonding material enhancers. Wallastonites are calcium silicate minerals which commonly occur in fibrous white masses and which have a triclinic structure. They can act as corrosion inhibitors. If too much wallastonite is used the shelf life of the mortar can be too short. If not enough wallastonite is used the stability of higher temperatures and resistance to corrosion can decrease. Acceptable compositions include 0% to 20% wallastonite, preferably 2% to 20% and more preferably 3% to 5%.

Compositions in accordance with the invention can also include rheology (flow) modifiers, such as bentonite clays. Bentonite clays are swellable in water and can therefore be used to thicken compositions and provide emulsifying properties to improve the handling properties of the uncured mortar. Bentonite clays are generally formed from colloidal hydrated alumino silicates (sodium aluminosilicates). They are members of the montmorillonite group. Accepted compositions include 5% or less, preferably 1.5 to 4% of rheology modifiers.

Talc (magnesium silicate) is also a useful component for providing flow modification and improved stability at higher temperatures. Talc should be present as 0–30%, preferably 5–30%, more preferably 5–15%.

Various clay fillers are advantageously included in compositions in accordance with the invention. Clay fillers can be used to improve thermal stability and lower the cost of the product. A preferred clay filler is kaolin clay, a calcium magnesium aluminosilicate. If too much clay filler is included, the product can have a relatively short shelf life. If not enough is used, thermal stability can be low. Generally, the clay filler portion should comprise 0 to 50% of the total compositions, preferably 5 to 50%, more preferably 10–15%.

Compositions in accordance with the invention can also include flocculating agents to help prevent separation of water from cement mass. Flocculating agents can comprise electrolytes which promote agglomeration of clay particles. One suitable flocculatory agent is tetrasodium pyrophosphate. Other flocculating agents include long chain polymers. Flocculating agents should be present as 0 to 10% preferably 2–10%, most preferably 1–5%.

Compositions in accordance with the invention can be made by mixing fine particles of the cement composition with water. Generally, particles in accordance with the invention should be less than 100 microns and should optimally be in the range of 5–50 microns and are typified by a 325 mesh size. It is also preferred that refractory material comprise two components, preferably phlogopite mica and neptheline syenite. The bentonite clay flow additive is preferably an acid washed bentonite clay, which retains the positive charge of the acid protons within its silicate matrix. Conventional ball clays and conventional bentonite clays generally contain high levels of silica and therefore should not be used for a silica-free material in accordance with the invention unless something is done to reduce silica levels. This can include acid and/or water washing to reduce silica levels.

Compositions in accordance with the invention can exhibit the cold bonding strength (at least about 150 and even over about 160 under ASTM C198) of clay based cements and the heat resistance (PCE at least about 1700° F., even over about 1800° F.) of $SiO_2$ based cements.

The invention will be now be described with reference to the following examples, which are provided for purposes of illustration only and are not intended to be construed in a limiting sense.

One preferred embodiment includes, by weight percent, 35.5% sodium silicate, 2% bentonite clay, 12% filler clays, 4% wallastonites, 24% neptheline syenite, 4% mica, 10% talc, 2.4% pyrophosphate and the balance (6.1%) water.

Other substantially silica free mortar compositions include:

|  | ranges % wt. (approximate) | more preferred % wt. (approximate) |
|---|---|---|
| Sodium silicate: | 20–50 30–40 | 32 to 37 |
| Bentonite clay (sodium aluminosilicate a mortmorillonite) | 0 to 5% 1.5 to 4% | 2 |
| Calcium silicate (wallastonites) | 0 to 20% 2 to 20% | 3 to 5% |
| kaolin clay (filler clay) (calcium/magnesium aluminosilicate) | 0 to 50% 5 to 50% | 10 to 15% |
| Talc (magnesium silicate) | 0 to 30% 5 to 30% | 5 to 15% |
| Micas (hydrous aluminosilicate) | 0 to 30% 2 to 30% | 4 to 10% |
| Flocculating agent (Tetrasodium pyrophosphate) | 0 to 10% 2 to 10% | 1 to 5% |
| Nepthelene syenite | 0 to 50% 2 to 30% | 4 to 10% |
| Silicon dioxide | 0 to 5% 0 to 1% | 0 to 0.10% |

Other examples are shown below in Table 1. All values are identified as weight per cent.

TABLE 1

| Component | SiO₂ Based Cement | Clay Based Cement | Low SiO₂ Cement |
|---|---|---|---|
| Sodium silicate | 37 | 45 | 35 |
| Bentonite | 4 | | 2 |
| Mica | | | 4 |
| Nepheline syenite | | | 23 |
| Wallastonite | 8 | 23 | 4 |
| Kaolin clay | 10 | 28 | 14 |
| Talc | | | 10 |
| Flocculant | | | 2 |
| Water | 2 | 2 | 6 |
| % SiO₂ | ~39% | ~2% | <1% |
| Loss % by weight up to 2000° F. | 9% | 16.7% | 23% |
| Shelf Stability | >6 months | <6 months | >6 months |
| Cold Bonding Strength(ASTM C198) | 663 | 165 | 165 |
| Modulus of rupture (psi) 220–230° F. | 579 | 75 | 160 |
| PCE (ASTM C24) | 1801° F. | 2208° F. | 1873° F. |

The results of the testing shown in Table 1 indicate that compositions in accordance with the invention, particularly those involving acid washed bentonite clay provide suitable workability with the sufficient level of refraction material. Compositions in accordance with the invention can include at least the cold bonding strength of clay based cements and heat resistance of SiO₂ based cements.

It will thus be seen that the objects set forth above, among those made apparent from the preceding description, are efficiently attained and, since certain changes may be made in carrying out the above method and in the compositions set forth without departing from the spirit and scope of the invention, it is intended that all matter contained in the above description shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

Particularly, it is to be understood that in said claims, ingredients or compounds recited in the singular are intended to include compatible mixtures of such ingredients wherever the sense permits.

What is claimed is:

1. A refractory air setting mortar composition comprising: about 20% to 50% sodium silicate, more than 0% but not more than about 5% bentonite clay, more than 0% but not more than about 20% calcium silicate, less than about 50% kaolin clay, less than about 30% talc, less than about 30% mica, less than about 10% tetrasodium pyrophosphate and less than about 50% nepheline syenite.

2. The composition of claim 1, in which the total crystalline silicon dioxide content is less than 1%.

3. The composition of claim 1, in which the total crystalline silicon dioxide content is less than 0.10%.

4. The composition of claim 1, wherein the crystalline silicon dioxide content of the components varies from 0–3%, and overall total composition is less than 0.10%.

5. The composition of claim 1, wherein the sodium silicate is present in a range of about 30–50%.

6. The composition of claim 1, comprising bentonite clay and sodium aluminosilicate, combined greater than 0%, but less than about 5%.

7. The composition of claim 1 which further comprises a bond material enhancer in an amount from about 2% to about 20%.

8. The composition of claim 7, wherein the bond material enhancer comprises Wollastonite.

9. The composition of claim 1, wherein the kaolin clay is present in a range of about 10–15%.

10. The composition of claim 1, wherein the talc is present in a range 5–30%.

11. The composition of claim 1, wherein the mica is present in a range of about 4–10%.

12. The composition of claim 1, comprising a flocculating agent, present in a range from about 2–10%.

13. The composition of claim 1, comprising less than 1% silicon dioxide, in which the air setting time, cold bonding strength and thermal stability as measured by PCE, meets ASTM standards for cement containing silicon dioxide.

14. A cured refractory air setting mortar composition used in a furnace comprising cured mortar, the mortar formed from a composition comprising about 20 to 50% sodium silicate, more than 0% and not more than about 5% bentonite clay, more than 0% and not more than about 20% calcium silicate, less than 50% kaolin clay, less than about 30% talc, less than about 30% mica, less than about 10% tetrasodium pyrophosphate and less than about 50% nepheline syenite.

15. A refractory air setting mortar composition containing less than 1% SiO₂, comprising about 20% to 50% sodium silicate and an effective amount of naphthalene syenite and a hydrous aluminosilicate to provide increased heat resistance.

16. The composition of claim 15, wherein the hydrous alumino silicate component comprises mica.

17. The composition of claim 15, comprising about 2 to 30% neptheline syenite.

18. The composition of claim 17, comprising about 2 to 30% neptheline syenite.

19. The composition of claim 18, comprising no more than 0.1% SiO₂.

20. The composition of claim 15, wherein the heat resistance provides a pyrometric cone equivalent of at least about 1700° F.

21. The composition of claim 15, wherein the cold bonding strength is at least 150 under ASTM C198.

* * * * *